March 5, 1946.  J. SCHOENFELD  2,395,911
PISTON AND GUIDE STRUCTURE FOR ENGINES
OF THE RECIPROCATING PISTON TYPE
Filed Nov. 27, 1942  2 Sheets-Sheet 1

INVENTOR.
JOSEPH SCHOENFELD.
BY Castberg & Roemer

March 5, 1946.　　J. SCHOENFELD　　2,395,911
PISTON AND GUIDE STRUCTURE FOR ENGINES
OF THE RECIPROCATING PISTON TYPE
Filed Nov. 27, 1942　　2 Sheets-Sheet 2
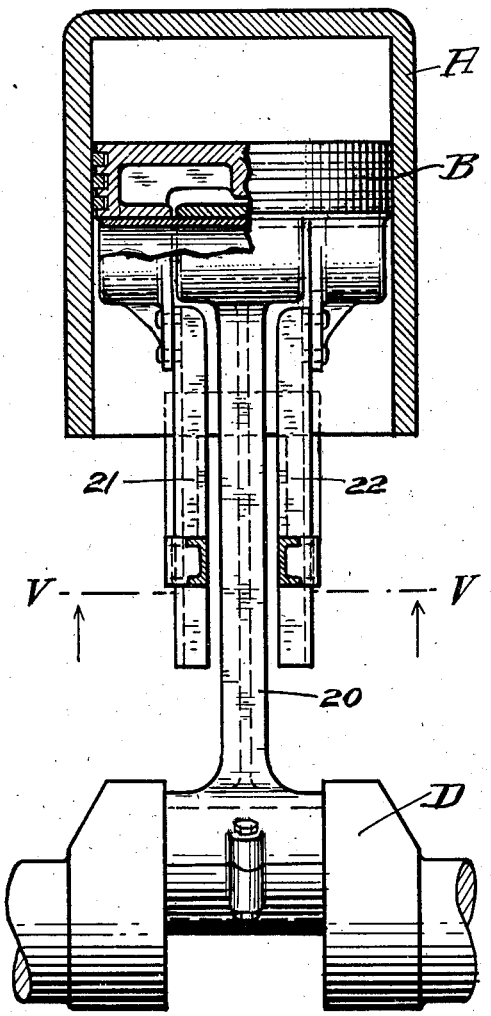
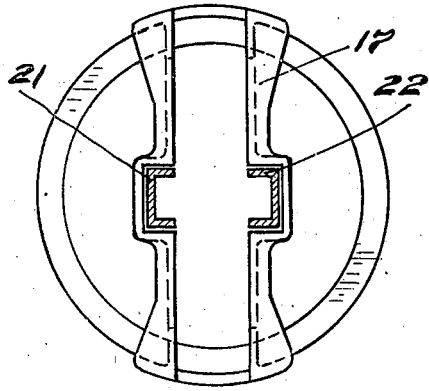
INVENTOR.
JOSEPH SCHOENFELD.
BY
Castberg & Roemer Patented Mar. 5, 1946

2,395,911

UNITED STATES PATENT OFFICE 2,395,911

PISTON AND GUIDE STRUCTURE FOR ENGINES OF THE RECIPROCATING PISTON TYPE

Joseph Schoenfeld, Fairfax, Calif.

Application November 27, 1942, Serial No. 467,079

10 Claims. (Cl. 74—44)

This invention relates to a piston and guide structure for engines of the reciprocating piston type, this application being a continuation in part of my application entitled "Piston and guide for internal combustion engines," filed June 14, 1941, Serial Number 398,018.

The object of the present invention is generally to improve and simplify the construction and operation of pistons of engines of the reciprocating piston type; to reduce the length and weight of the piston and especially to provide a short piston and an auxiliary guide therefor, whereby any tendency of the piston to cock, tilt, or bind with relation to the cylinder wall is entirely eliminated.

The piston and guide structure is shown by way of illustration in the accompanying drawings, in which—

Fig. 4 is a section similar to Fig. 1, but showing a modification of the piston guiding structure; and Fig. 5 is a cross-section taken on line V—V of Fig. 4.

In regard to the foregoing application, in an internal combustion engine particularly of the high speed type, piston friction constitutes by far the largest item in the list of mechanical losses. The most immediate and greatest cause of piston friction is the shearing of the oil film formed between the cylinder and piston and the power absorbed is dependent upon the thickness of the film, the viscosity of the oil, the area presented to the piston, and the speed.

The co-efficient of friction between the piston and cylinder is very much higher than that of the bearings and is in great part due to thickening of the lubricant by partial carbonization, as the lubricating film, or oil is directly exposed to the flame of combustion and as such decidedly increases the resistance to shear. Another factor producing friction is the pressure exerted by the piston against the cylinder wall due to the inertia of the reciprocating parts, and the area of contact between piston and cylinder. The length of the connecting-rod also has some influence upon piston friction, as upon it and the crank-throw depends the obliquity of the thrust between the crank pin and piston.

An ideal piston for a high-speed type of internal combustion engine should fulfill the following requirements:

1. Should reduce friction to the lowest possible limit.
2. Must rapidly dissipate heat to the walls of the cylinder.
3. Must prevent passage of lubricating oil to the combustion chamber.
4. Should have a minimum of weight.
5. Must provide an adequate support for the wrist pin.
6. Must be adequately guided to prevent tilting or binding with relation to the cylinder walls.

Requirements 1 and 4 are largely interdependent as the major portion of the average pressure exerted by the piston against the cylinder wall is in any high speed engine, due to the resolved component of the inertia forces, hence if the weight is reduced, inertia forces are reduced, and the contact surface between the piston cylinder may be reduced in proportion to weight reduction.

Figure 1:
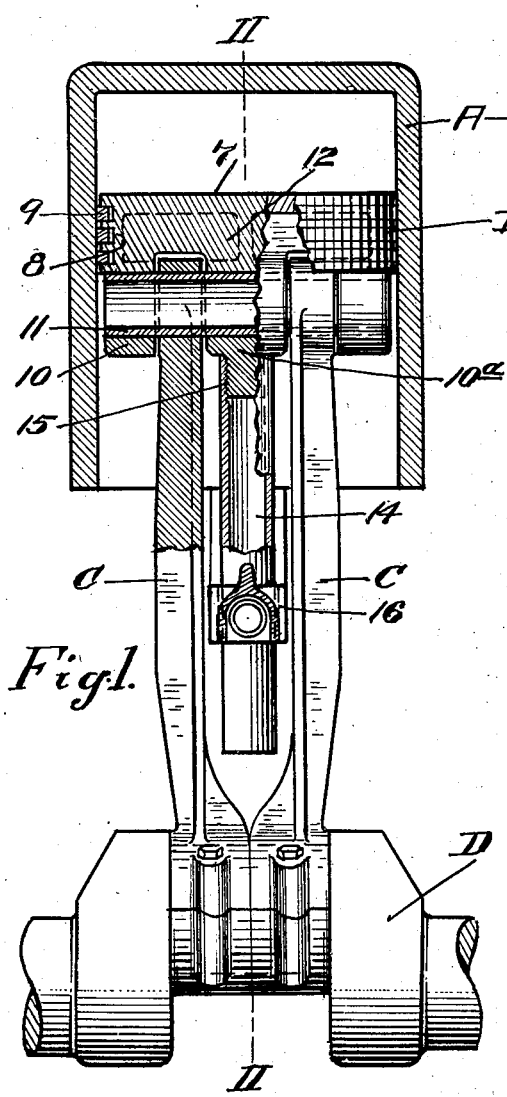
Fig. 1 is a side elevation in section of a single cylinder engine, said section showing the piston and guide structure.

A piston structure fulfilling the requirements enumerated, forms the subject matter of the present application, and will now be described in detail:

Referring to Fig. 1, A indicates the cylinder of an engine, B, the piston, C the connecting rod, and D the crank shaft to which the piston and rod are connected. The piston proper comprises a head or crown portion 7, a ring portion 8 carrying a suitable number of rings 9, and bosses or bearing lugs 10 to receive and secure a wrist pin 11. The bearing lugs are cast integral with the ring portion 8 and are connected with the crown 7 by one or more ribs 12 so as to provide an adequate support for the wrist pin.

Figure 2:
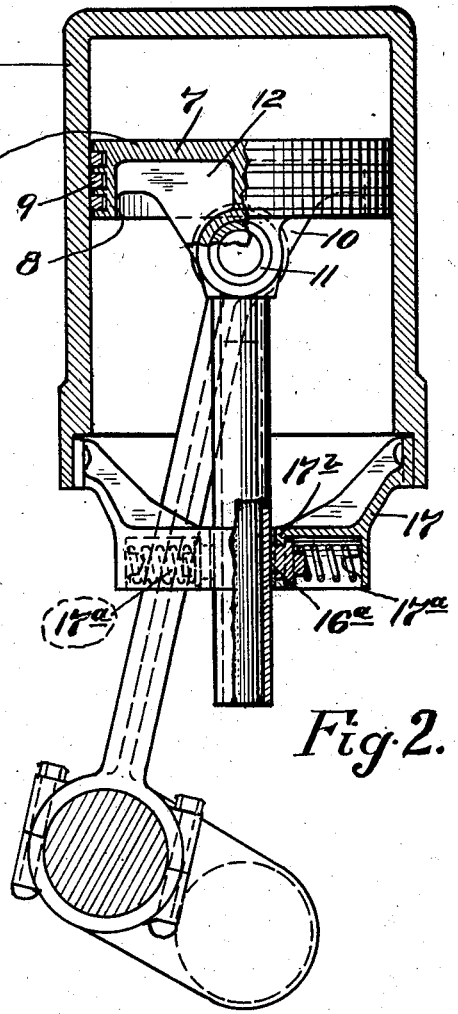
Fig. 2 is a vertical central section taken on line II—II of Fig. 1.

The piston, as will be noted, is exceptionally short in proportion to its diameter and as such would have a tendency to cock or tilt about the wrist pin with a resultant tendency to bind or seize with relation to the cylinder wall. To prevent such seizure, a guide is provided consisting of a rod or tube 14 which is secured at its upper end by threads 15 or other means to a central bearing lug 10a. The lower end of the rod extends through a guide bearing 16 which in turn is supported in a cross-bracket 17 secured to the lower end of the cylinder or otherwise. The guide rod is disposed at the center of the piston on the central longitudinal axis of the cylinder, and as this is the case, it is necessary to fork the connecting rod as shown in Fig. 1. However, a conventional type of connecting rod may be employed as shown at 20 in Fig. 4 by employing one or two guide rods as indicated at 21 and 22, this being probably the preferred type of structure. Whether one or two guide rods are employed, they are rigidly secured to the piston at their upper ends and must either have ample clearance where they pass through the guide bearings or the guide bearings must have a slight lateral movement as there would otherwise be a tendency to bind, particularly after the clearance between the piston and the cylinder wall has increased by wear. That is, no matter how well a piston is fitted with relation to the cylinder, a certain amount of clearance must be provided; first to permit an oil film to be formed between the piston and cylinder wall, and secondly to allow for expansion of the piston as it becomes heated during operation of the engine. This clearance may be only 3/1000 of an inch when an engine is new, but it becomes greater as wear takes place. Hence it is possible for the piston to move laterally within the cylinder, and it actually does move laterally within the cylinder due to the thrust on the piston during the working and compression stroke when the angularity assumed by the connecting rod, particularly at half stroke, reaches a maximum position. Inasmuch as the guide rod is rigidly secured to the piston, when the piston moves laterally in the cylinder no matter how small the lateral movement may be, the rod must move laterally the same distance. Hence, the guide bearing must have substantially the same clearance or it must be able to move laterally as the rod would otherwise tend to bend or bind. Such a bearing is shown in Fig. 2. It is made in two halves, 16a, which are supported in the bracket 17 and each half is engaged by a compression spring 17a. Thus the guide bearing is yieldingly supported in the bracket and the guide rod may move laterally a limited distance, for instance, to a point when engagement is made with the bracket as at 17b. The main purpose of the guide rods, as already stated, is to guide the piston and prevent tilting thereof as by so doing it permits the use of an exceptionally short piston. This reduces weight, it proportionately reduces inertia forces, it reduces the bearing area between piston and cylinder wall, it permits a larger ring section and more rings to rapidly dissipate heat to the cylinder wall and to prevent passage of oil into the combustion chamber.

Figure 3:
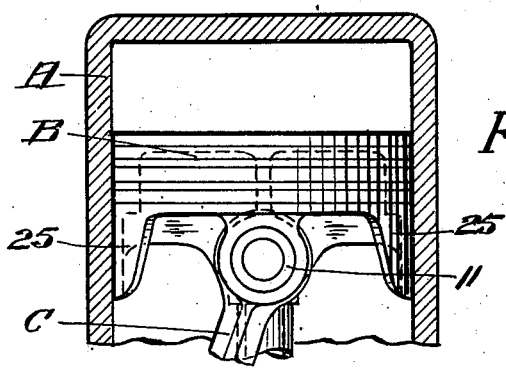
Fig. 3 shows a modification of the piston structure of Figs. 1 and 2.

With regard to area of surface between piston and cylinder wall, it should be clear that only the surface at right angles to the line of the crank shaft is operative, the surface at the sides of the piston receive no thrust at all. It is therefore clearly desirable to remove all inoperative surfaces in order to reduce, as far as possible, the area of the oil film in shear. In view of the very light loading to which the piston is subjected, a relatively small area of bearing surface suffices, and for a light weight piston such as here shown, an actual bearing surface on either side equal to fifty percent of the area of the crown is more than ample, such surfaces in the form of shoes or slips as indicated at 25 in Fig. 3 will accordingly be provided if the ring portion area is not sufficient.

Whether one or more guide rods are employed, it is desirable that they be placed on a line which will intersect the longitudinal axis of the wrist pin and that they are disposed at right angles thereto so as to align with the longitude axis of the cylinder. In Fig. 4 the guide rods are disposed one on each side of the connecting rod, however, one guide rod can be employed and placed at one side of a conventional connecting rod but in that case a counterweight should be placed on the opposite side of the piston to insure balance. The actual thrust or load to which the guide rod or rods are subjected is comparatively small; hence a thin walled tube of small diameter, or a channel shaped section as shown in Figs. 4 and 5, will more than suffice and as this is the case, it will be obvious that whether one or two guide rods are used the weight added to the piston is negligible. The advantages gained besides that of reducing the weight of the piston, the inertia forces, the material reduction in friction due to the smaller friction and shear area presented, better heat transmission or dissipation to the cylinder wall, etc., are a material reduction in the length of the cylinders as a shorter piston can operate in a shorter cylinder, the couple between the piston and crank shaft or in other words the length of the connecting rods may be also reduced, hence the overall height and weight of the engine as a whole is materially reduced.

While the piston and guide structure has been described for particular use in high speed internal combustion engines, it should be understood that they are equally adaptable to other types of engines known as compressors, etc., employing a reciprocating piston, and while these and other features have been more or less specifically described, I wish it understood that changes may be resorted to within the scope of the appended claims, and that the materials and finish of the various parts employed may be varied as the experience of the manufacturer or varying conditions or use may demand.

Having thus described my invention, what I claim and desire to secure by Letters Patent is:

1. The combination with an engine having a cylinder, a piston, a crank shaft, a wrist pin in the piston and a connecting rod connecting the wrist pin and crank shaft to impart reciprocal movement to the piston, of an auxiliary guide rod rigidly secured to the piston at one end at one side of the connecting rod and at right angles to the wrist pin, and a guide bearing adjacent an end of the cylinder through which the other end of the guide rod extends, said guide rod and bearing securing the piston against tilting movement about the wrist pin.

2. The combination with an engine having a cylinder open at one end, a piston, in the cylinder a crank shaft and a connecting rod connecting the piston and crank shaft to impart reciprocal movement to the piston, of an auxiliary guide rod rigidly secured to the piston at one end, a guide bearing adjacent the open end of the cylinder through which the other end of the guide rod extends, said guide rod and bearing securing the piston against tilting movement with relation to the interior wall of the cylinder, and resilient means permitting lateral movement of the guide rod in the guide bearing to substantially conform with the lateral movement of the piston in the cylinder to permit the wall of the cylinder to support and guide the piston during reciprocal movement of the piston in the cylinder.

3. The combination with an engine having a cylinder open at one end, a piston, in the cylinder a crank shaft, a wrist pin in the piston and a connecting rod connecting the wrist pin and crank shaft to impart reciprocal movement to the piston, of an auxiliary guide rod rigidly secured to the piston at one end and at right angles to the wrist pin, a guide bearing adjacent the open end of the cylinder through which the other end of the guide rod extends, said guide rod and bearing securing the piston against tilting movement about the wrist pin, and resilient means permitting lateral movement of the guide rod in the guide bearing to substantially conform with the lateral movement of the piston in the cylinder to permit the wall of the cylinder to support and guide the piston during reciprocal movement of the piston in the cylinder.

4. The combination with an engine having a cylinder, a piston, a crank shaft, a wrist pin in the piston and a connecting rod connecting the wrist pin and crank shaft to impart reciprocal movement to the piston, of an auxiliary guide rod rigidly secured to the piston at one end and at right angles to the wrist pin, a guide bearing adjacent an end of the cylinder through which the other end of the guide rod extends, said guide rod and bearing securing the piston against tilting movement about the wrist pin, and resilient means permitting lateral movement of the guide bearing.

5. The combination with an engine having a cylinder, a piston, a crank shaft and a connecting rod connecting the piston and crank shaft to impart reciprocal movement to the piston, of an auxiliary guide rod rigidly secured to the piston at one end, a guide bearing adjacent one end of the cylinder through which the other end of the guide rod extends, said guide rod and bearing securing the piston against tilting movement with relation to the interior wall of the cylinder, and resilient means permitting lateral movement of the guide bearing.

6. The combination with an engine having a cylinder, a piston, a crank shaft, a wrist pin in the piston and a connecting rod connecting the wrist pin and crank shaft to impart reciprocal movement to the piston, of an auxiliary guide rod rigidly secured to the piston at one end on a line intersecting the longitudinal axis of the wrist pin and at right angles thereto, a guide bearing adjacent an end of the cylinder through which the other end of the guide rod extends, said guide rod and bearing securing the piston against tilting movement about the wrist pin, and yielding means supporting the guide bearing to permit a limited lateral movement thereof.

7. The combination with an engine having a cylinder open at one end and a piston reciprocally mounted within the cylinder of an auxiliary guide rod rigidly secured at one end to the piston and disposed on a line parallel to the longitudinal axis of the piston and at one side thereof, a guide bearing adjacent the open end of the cylinder through which the other end of the rod extends, a wrist pin in the piston, and a connecting rod connecting the wrist pin with a crank shaft to transmit reciprocal movement of the piston to rotate the crank shaft, said guide rod and bearing preventing tilting of the piston about the wrist pin during reciprocal movement of the piston.

8. The combination with an engine having a cylinder open at one end, a piston reciprocally mounted within the cylinder, a crank shaft and a connecting rod pivotally connected to the piston at one end adjacent the crown thereof and to the crank shaft at the opposite end, said connecting rod being disposed centrally of the piston and cylinder of an auxiliary guide rod rigidly secured at one end to the piston at one side of the connecting rod and disposed on a line parallel to the longitudinal axis of the cylinder and piston, and an auxiliary guide bearing adjacent the open end of the cylinder through which the other end of the auxiliary guide rod extends, said auxiliary guide rod and auxiliary guide bearing securing the piston from tilting about the point where the connecting rod is pivoted to the piston.

9. The combination with a trunk type engine having a cylinder open at one end, a trunk piston reciprocally mounted within the cylinder, a crank shaft and a connecting rod pivotally connected to the piston at one end and to the crank shaft at the opposite end, said connecting rod being disposed centrally of the piston and cylinder of means for preventing tilting of the piston about the pivotal connection with the connecting rod, said means comprising an auxiliary guide rod rigidly secured at one end to the piston at one side of the connecting rod and disposed on a line parallel to the longitudinal axis of the cylinder and piston and an auxiliary guide bearing adjacent the open end of the cylinder through which the other end of the auxiliary guide rod extends.

10. The combination with a trunk type engine having a cylinder open at one end, a trunk piston reciprocally mounted within the cylinder, a crank shaft and a connecting rod pivotally connected to the piston at one end and to the crank shaft at the opposite end, of means for preventing tilting of the piston about the pivotal connection with the connecting rod, said means comprising a pair of guide rods rigidly secured at one end to the piston, one on each side of the connecting rod and parallel to the longitudinal axis of the cylinder, and a pair of guide bearings adjacent the open end of the cylinder through which the opposite ends of the guide rods extend.

JOSEPH SCHOENFELD.